(12) United States Patent
Okuno et al.

(10) Patent No.: US 11,117,768 B2
(45) Date of Patent: Sep. 14, 2021

(54) MEDIUM FEEDING DEVICE AND IMAGE READING APPARATUS

(71) Applicant: SEIKO EPSON CORPORATION, Tokyo (JP)

(72) Inventors: Tokujiro Okuno, Kitakyushu (JP); Hiromichi Kitsuki, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/232,798

(22) Filed: Dec. 26, 2018

(65) Prior Publication Data
US 2019/0193972 A1 Jun. 27, 2019

(30) Foreign Application Priority Data
Dec. 27, 2017 (JP) .............................. JP2017-250711

(51) Int. Cl.
  *B65H 9/00* (2006.01)
  *B65H 3/06* (2006.01)
  *B65H 7/08* (2006.01)
  *H04N 1/00* (2006.01)

(52) U.S. Cl.
  CPC ............. *B65H 9/002* (2013.01); *B65H 3/063* (2013.01); *B65H 3/0653* (2013.01); *B65H 7/08* (2013.01); *H04N 1/00718* (2013.01); *B65H 2402/46* (2013.01); *B65H 2403/724* (2013.01); *B65H 2404/133* (2013.01); *B65H 2553/822* (2013.01)

(58) Field of Classification Search
  CPC .... B65H 9/002; B65H 7/08; B65H 2403/724; H04N 1/00718
  See application file for complete search history.

(56) References Cited

U.S. PATENT DOCUMENTS

| | | | | |
|---|---|---|---|---|
| 5,278,624 A * | 1/1994 | Kamprath | ............... | B65H 9/002 399/395 |
| 6,059,285 A * | 5/2000 | Suga | ...................... | B65H 9/002 271/228 |
| 8,020,858 B2 * | 9/2011 | deJong | .................. | B65H 9/002 271/228 |
| 8,056,897 B2 * | 11/2011 | deJong | .................. | B65H 9/002 271/227 |
| 8,371,578 B2 * | 2/2013 | Ishikawa | ................ | B65H 9/002 271/227 |
| 8,998,200 B2 * | 4/2015 | Moto | ..................... | B65H 9/002 271/228 |

(Continued)

FOREIGN PATENT DOCUMENTS

| | | |
|---|---|---|
| JP | H01-317938 | 12/1989 |
| JP | H04-286563 | 10/1992 |
| JP | 2011-071763 | 4/2011 |

*Primary Examiner* — Patrick Cicchino
(74) *Attorney, Agent, or Firm* — Workman Nydegger

(57) ABSTRACT

An image reading apparatus includes a feeding roller that includes a first roller and a second roller provided at an interval in a width direction intersecting a medium feeding direction, and feeds a sheet from a placing section; and a skew detection section that detects skew of the sheet fed from the feeding roller. Skew is corrected by giving a difference between a rotation speed of the first roller and a rotation speed of the second roller with respect to at least one of the relevant sheet detected by the skew detection section and subsequent sheets fed following the relevant sheet based on a skew amount in the sheet.

13 Claims, 11 Drawing Sheets

(56) References Cited

U.S. PATENT DOCUMENTS

| | | | |
|---|---|---|---|
| 10,404,878 B2* | 9/2019 | Shiota | H04N 1/00734 |
| 2011/0075168 A1* | 3/2011 | Ikari | H04N 1/3878 |
| | | | 358/1.9 |
| 2020/0198912 A1* | 6/2020 | Okano | B65H 7/12 |

* cited by examiner

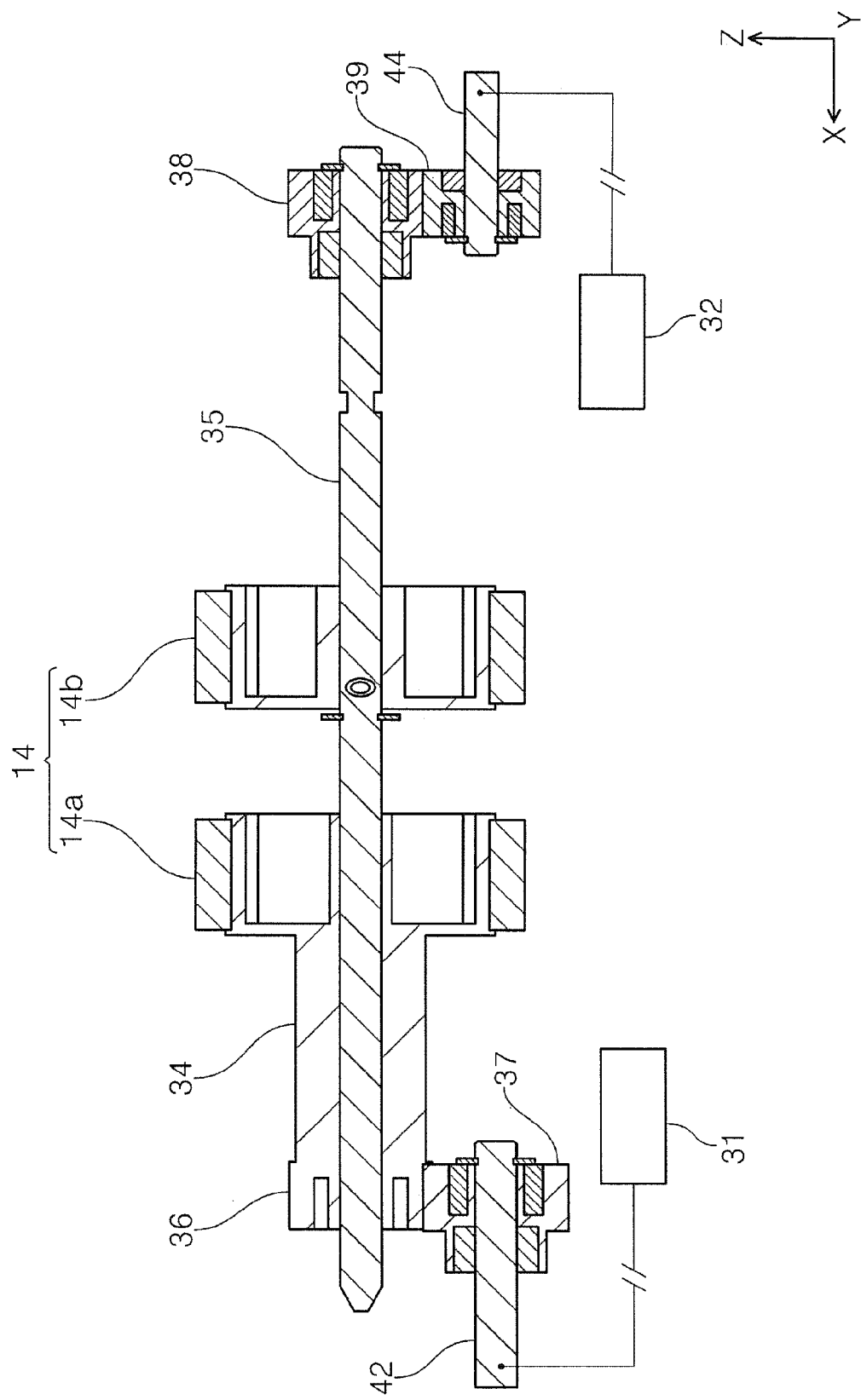

MEDIUM FEEDING DEVICE AND IMAGE READING APPARATUS

BACKGROUND

1. Technical Field

The present invention relates to a medium feeding device that feeds a medium and an image reading apparatus that reads an image of the medium fed by the medium feeding device.

2. Related Art

A scanner which is an example of an image reading apparatus is provided with a medium feeding device (also referred to as an Auto Document Feeder (ADF)) for automatically sending a medium (document), automatically sends a plurality of media which are set in a medium tray, one by one, and is configured so that image reading at a reading section can be continuously performed.

In such a scanner, when the medium is sent toward the reading section by the medium feeding device, skew (also referred to as skewing) in which the medium is obliquely sent may occur. When the medium skews, there is a concern that paper jam occurs in a transport path or the image read by the reading section is oblique.

Therefore, a scanner including a medium feeding device, which includes a medium sensor for detecting a transported medium and is configured such that skew of the medium is detected by the medium sensor and a skewing correction process for sending the medium can be executed to correct the skew according to a detected skew amount, is proposed (for example, JP-A-2011-071763).

In JP-A-2011-071763, the skewing correction process is performed by controlling driving of a pair of resist rollers provided at an interval in a width direction intersecting a medium transporting direction. Specifically, in the pair of resist rollers, one resist roller and the other resist roller are configured to be rotationally driven by independent motors, and a difference in rotation speed between one resist roller and the other resist roller is given, so that the skewing of the medium is corrected.

Here, in JP-A-2011-071763, the pair of resist rollers for correcting the skewing of the medium is provided in the medium transport path on a downstream side from a sending roller for sending the medium which is set in the medium tray. Therefore, in a section between the sending roller and the pair of resist rollers, skew of the medium cannot be corrected.

The medium, which is sent by the sending roller from the medium tray, may greatly skew in the section in which skew cannot be corrected. Therefore, it is necessary to set a wide path width to the pair of resist rollers in anticipation of skew thereby leading to an increase in size of the apparatus.

In addition, in JP-A-2011-071763, in a case where the plurality of media are fed from the medium tray, a pair of separation rollers for separating into a single sheet is provided on an upstream side of the pair of resist rollers. In a case where the skewing of the medium is corrected by the pair of resist rollers, a rear end side of the medium is nipped by the pair of separation rollers. Therefore, even if a difference in the rotation speed between one resist roller and the other resist roller of the pair of resist rollers is given, there is a concern that the medium cannot move in a direction to correct skew, and thus skew cannot be corrected or insufficient.

SUMMARY

An advantage of some aspects of the invention is to provide a medium feeding device capable of efficiently and reliably correcting skew of a transported medium while avoiding enlargement of a device, and an image reading apparatus including the same.

According to an aspect of the invention, there is provided a medium feeding device including: a processing section that processes a medium; a feeding section that includes a pair of first roller and second roller provided in a width direction intersecting a medium feeding direction, and feeds the medium from a medium placing section on which the medium is placed toward the processing section; a skew detection section that detects skew of the medium fed from the feeding section; and a control section that controls an operation of the feeding section. The control section is capable of executing skew correction control for correcting the skew with a difference between a rotation speed of the first roller and a rotation speed of the second roller with respect to at least one of a first medium detected by the skew detection section and subsequent media fed following the first medium based on a skew amount in the first medium.

With this configuration, the control section is capable of executing the skew correction control by giving the difference between the rotation speed of the first roller and the rotation speed of the second roller with respect to the first medium detected by the skew detection section or subsequent media fed following the first medium based on the skew amount in the first medium, so that the skew of the medium can be corrected at a position of the feeding section provided on a most upstream side of the medium transport path. That is, it is possible to perform correction of the skew of the medium at an early stage after start of feeding from the medium placing section. Therefore, it is possible to efficiently correct the skew of the medium.

In addition, it is not necessary to secure a wide path width of the medium transport path in anticipation of skew, and it is possible to avoid enlarging the device.

In addition, after the medium is started by the feeding section, the medium can be freely rotated until a leading end of the medium reaches a transport position by a next transport section, so that an effect of the skew correction control can be reliably obtained.

In the medium feeding device, the control section may stop one of the first roller and the second roller in a case of executing the skew correction control.

With this configuration, the control section stops one of the first roller and the second roller in a case of executing the skew correction control, so that a difference between a rotation speed of the first roller and a rotation speed of the second roller can be given.

In the medium feeding device, the skew detection section may be provided between the feeding section and the processing section, and may be disposed on an upstream side from an upstream side transport section, which is provided on a most upstream side among transport sections which transport the medium.

With this configuration, the skew detection section is provided between the feeding section and the processing section, and is disposed on the upstream side from the upstream side transport section, which is provided on the most upstream side among transport sections which transport the medium. Therefore, the control section can be configured to be capable of executing the skew correction control with respect to the first medium based on the skew amount in the first medium, which is detected the skew detection section.

In the medium feeding device, the skew detection section may be disposed so as to overlap with a part of the feeding section on a downstream side from a position at which the feeding section applies a feeding force to the medium.

With this configuration, skew of the medium fed by the feeding section can be early detected after the start of the feeding.

In the medium feeding device, the skew detection section may be configured to include a first medium detection section and a second medium detection section which are provided at an interval in the width direction and are capable of detecting the medium.

With this configuration, in an image reading apparatus which includes the skew detection section configured to include the first medium detection section and the second medium detection section which are provided at an interval in the width direction and are capable of detecting the medium, it is possible to obtain the same operational effects as those of the above configurations.

In the medium feeding device, the medium feeding device may further include a first driving source that drives the first roller, and a second driving source that drives the second roller.

With this configuration, the first roller and the second roller are respectively driven by individual driving sources, so that it is possible to easily perform the skew correction control for giving a difference between the rotation speed of the first roller and the rotation speed of the second roller.

The medium feeding device may further include a first driving source, a second driving source that drives the second roller, and a switching mechanism that switches a driving source for driving the first roller between the first driving source and the second driving source. The control section which controls an operation of the switching mechanism may cause the switching mechanism to be in a first state in which the first roller is driven by the first driving source in a case where the skew correction control is executed, and cause the switching mechanism to be in a second state in which the first roller is driven by the second driving source in a case where the skew correction control is not executed.

With this configuration, in a case where the skew correction control is executed, the control section causes the switching mechanism to be in the first state in which the first roller is driven by the first driving source, so that the first roller and the second roller can be respectively driven by individual driving sources. Therefore, it is possible to easily perform the skew correction control for giving a difference between the rotation speed of the first roller and the rotation speed of the second roller.

In addition, it is preferable that in a case where the skew correction control is not executed, for example, during normal feeding, the first roller and the second roller rotate at a constant speed.

With this configuration, in a case where the skew correction control is not executed, the control section causes the switching mechanism to be in the second state in which the first roller is driven by the second driving source, so that the rotation speed of the first roller and the rotation speed of the second roller can easily be the same.

The medium feeding device may further include a first rotation shaft to which the first roller is fixed and which is rotated by receiving power from the first driving source, and a second rotation shaft which is provided on a same axis as that of the first rotation shaft, to which the second roller is fixed, and which is rotated by receiving power from the second driving source. The switching mechanism may be configured to switch between the first state in which the first rotation shaft and the second rotation shaft are separated and rotated individually and the second state in which transmission of power from the first driving source to the first rotation shaft is interrupted, and the first rotation shaft and the second rotation shaft are connected to be integrally rotated.

With this configuration, the above configuration can be realized by the switching mechanism which is configured to switch between the first state in which the first rotation shaft and the second rotation shaft are separated and rotated individually and the second state in which transmission of power from the first driving source to the first rotation shaft is interrupted, and the first rotation shaft and the second rotation shaft are connected to be integrally rotated.

In the medium feeding device, the switching mechanism may be configured to include an electromagnetic clutch.

With this configuration, the configuration of switching between the first state and the second state can easily be realized.

According to another aspect of the invention, there is provided an image reading apparatus including: a reading section that reads a medium; and the medium feeding device according to the above description and including the reading section as the processing section.

With this configuration, in the image reading apparatus including the reading section that read an image of the medium, it is possible to obtain the same operational effects as those of the above configurations.

In the image reading apparatus, the reading section may also serve as the skew detection section.

With this configuration, since the reading section also serves as the skew detection section, it is possible to reduce the number of components and to reduce a manufacturing cost.

BRIEF DESCRIPTION OF THE DRAWINGS

The invention will be described with reference to the accompanying drawings, wherein like numbers reference like elements.

FIG. 11 is a sectional view illustrating another example of the driving mechanism of the first roller and the second roller.

DESCRIPTION OF EXEMPLARY EMBODIMENTS

First Embodiment

First, an outline of an image reading apparatus including a medium feeding device according to an embodiment of the invention will be described.

In the embodiment, as an example of the image reading apparatus, a document scanner (hereinafter, simply referred to as a scanner 1) capable of reading at least one surface of a front surface and a rear surface of a sheet as a "medium" is taken.

Figure 1:
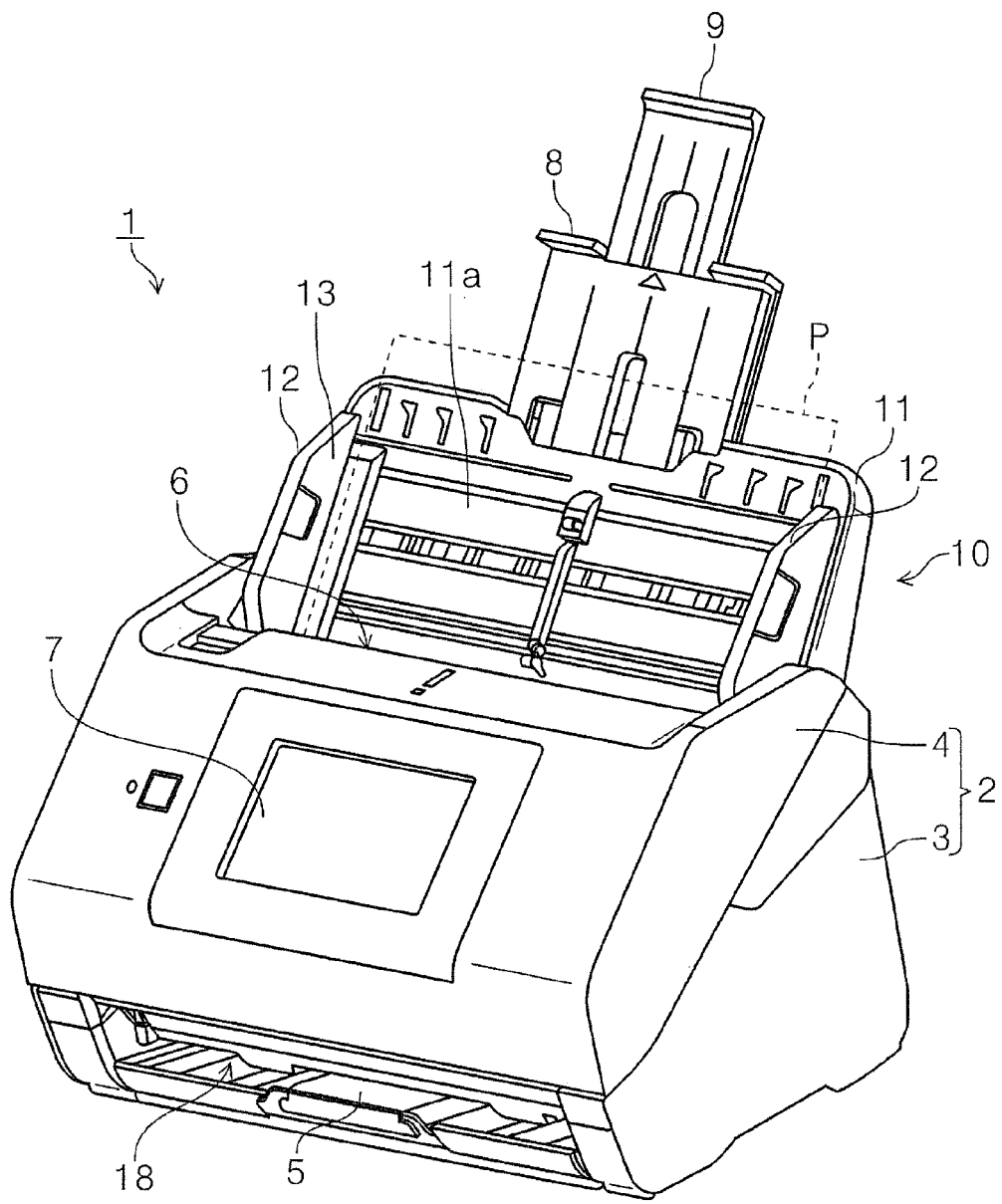
FIG. 1 is an external perspective view illustrating a scanner according to the invention.
Figure 2:
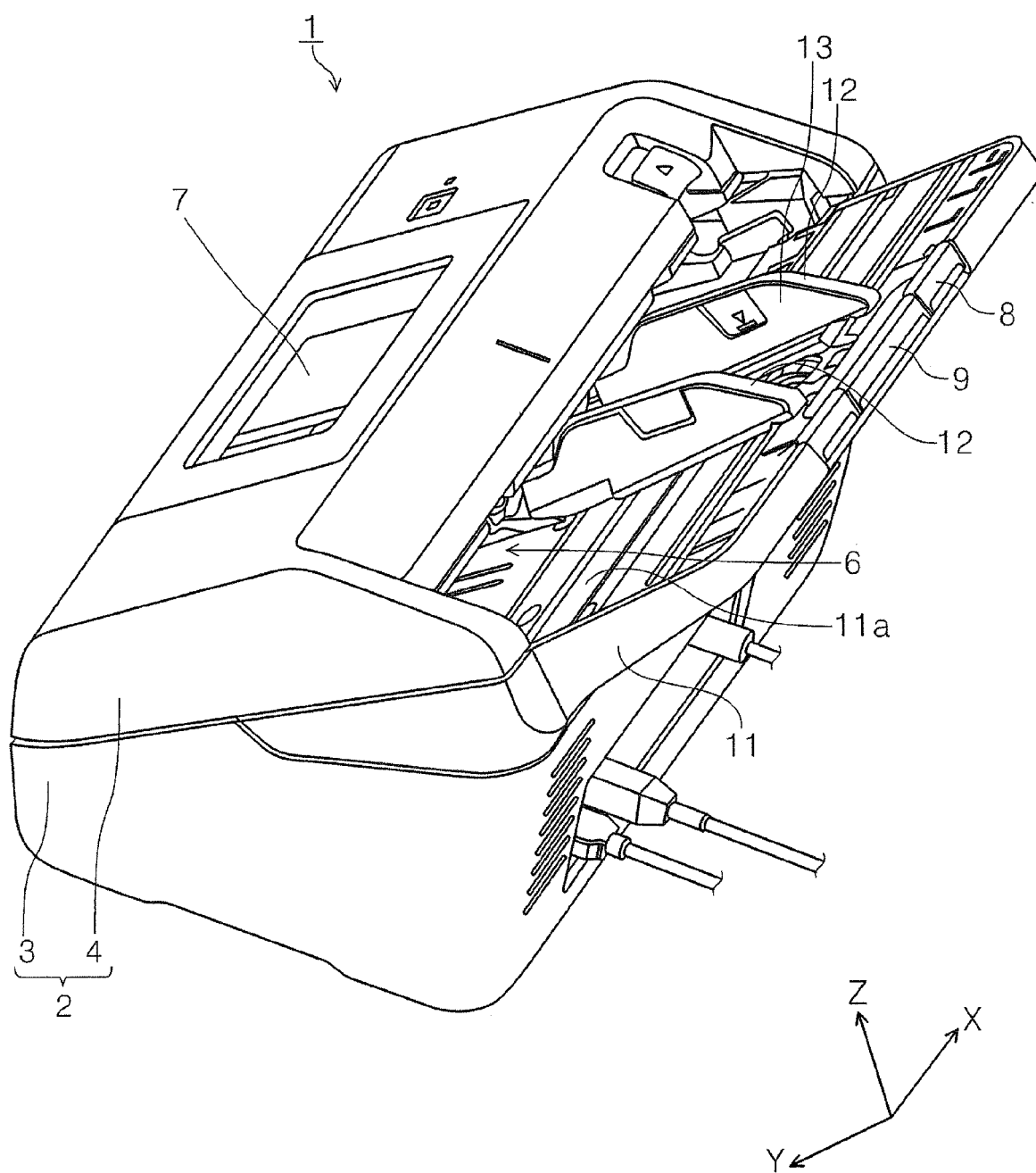
FIG. 2 is an external perspective view of the scanner according to the invention as viewed from a different angle from FIG. 1.
Figure 3:
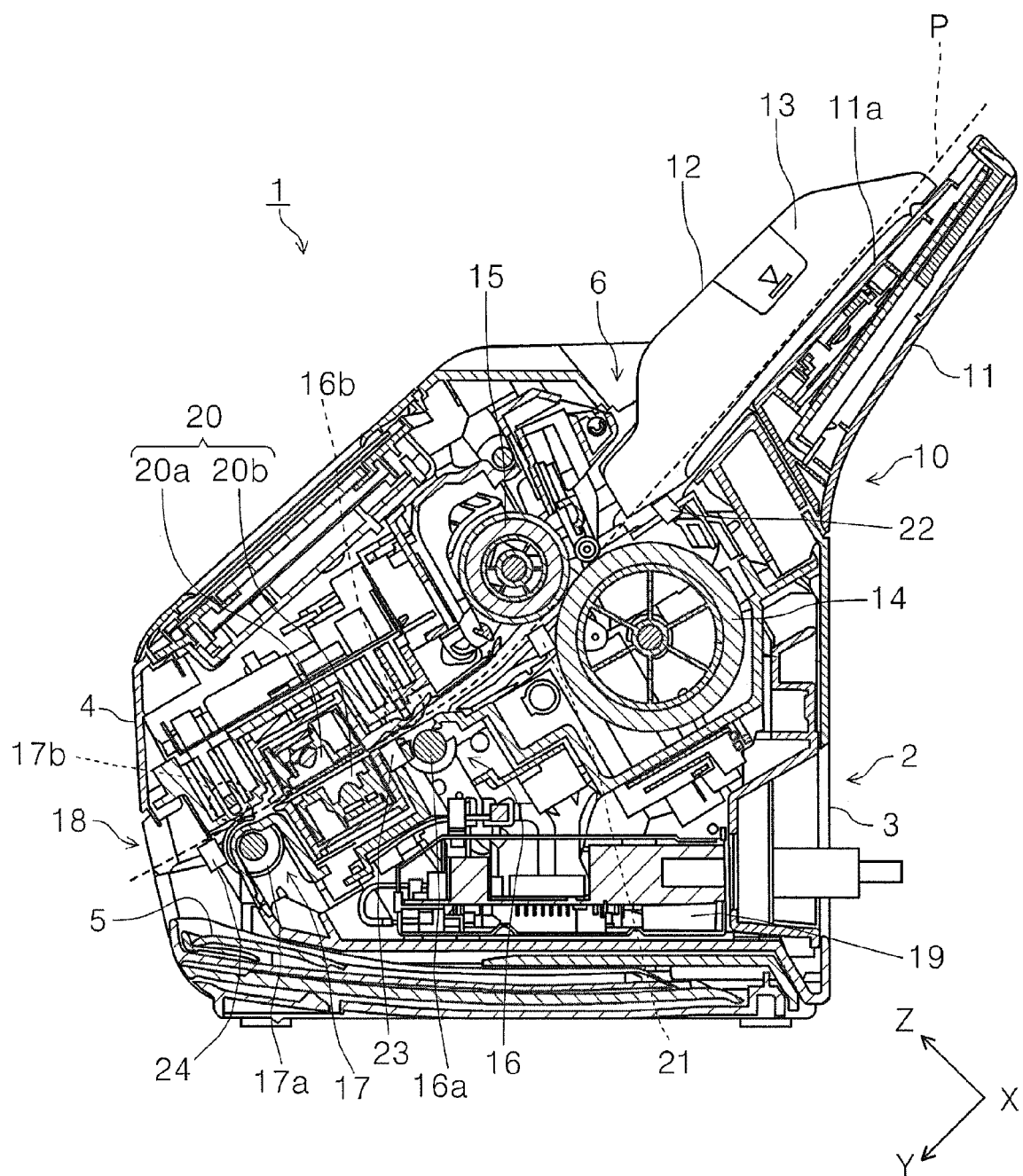
FIG. 3 is a side sectional view illustrating a sheet transport path in the scanner according to the invention.
Figure 4:
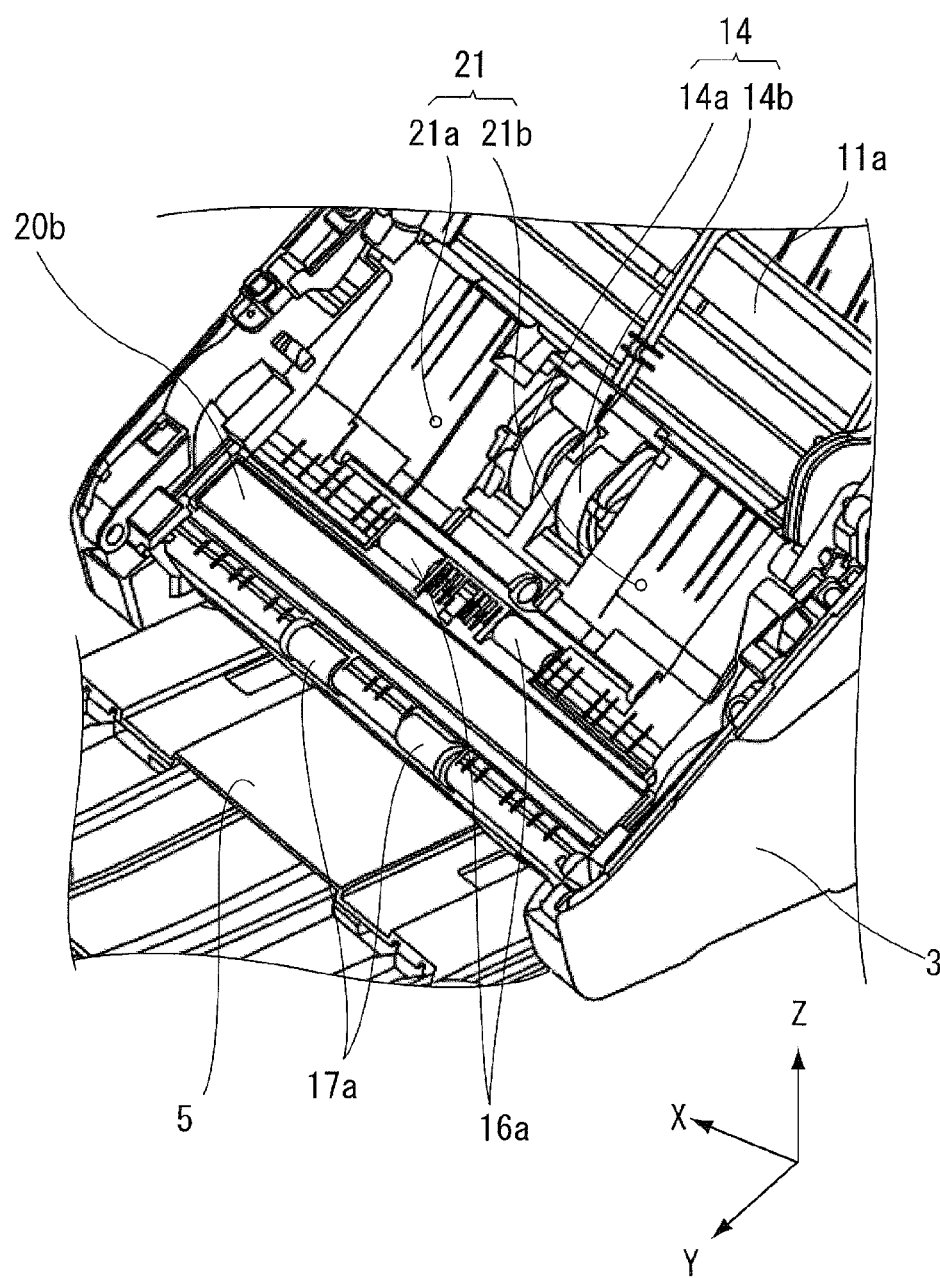
FIG. 4 is a perspective view illustrating a state where an upper unit of the scanner according to the invention is opened.
Figure 5:
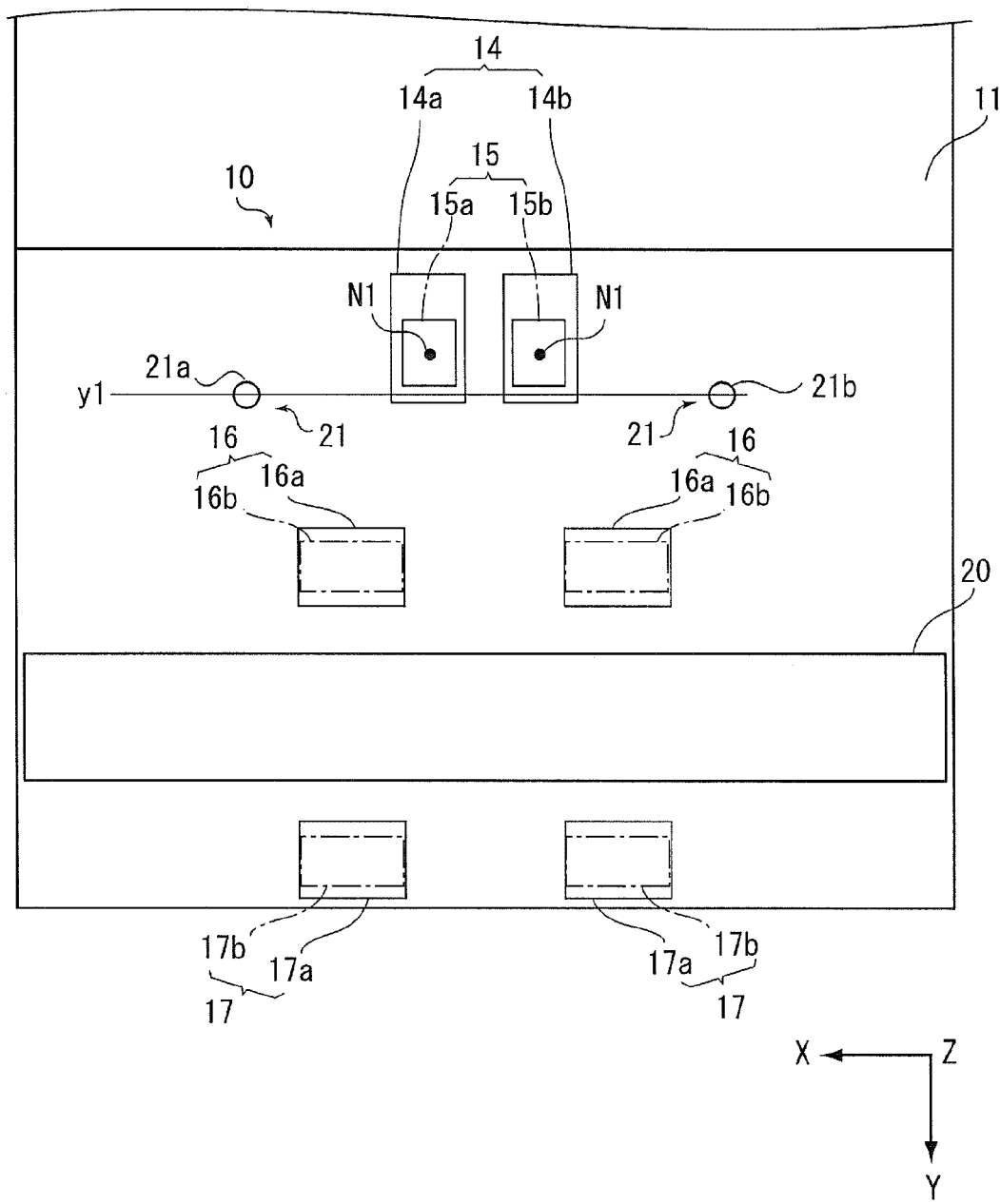
FIG. 5 is a schematic plan view of the sheet transport path in the scanner according to the invention.
Figure 6:
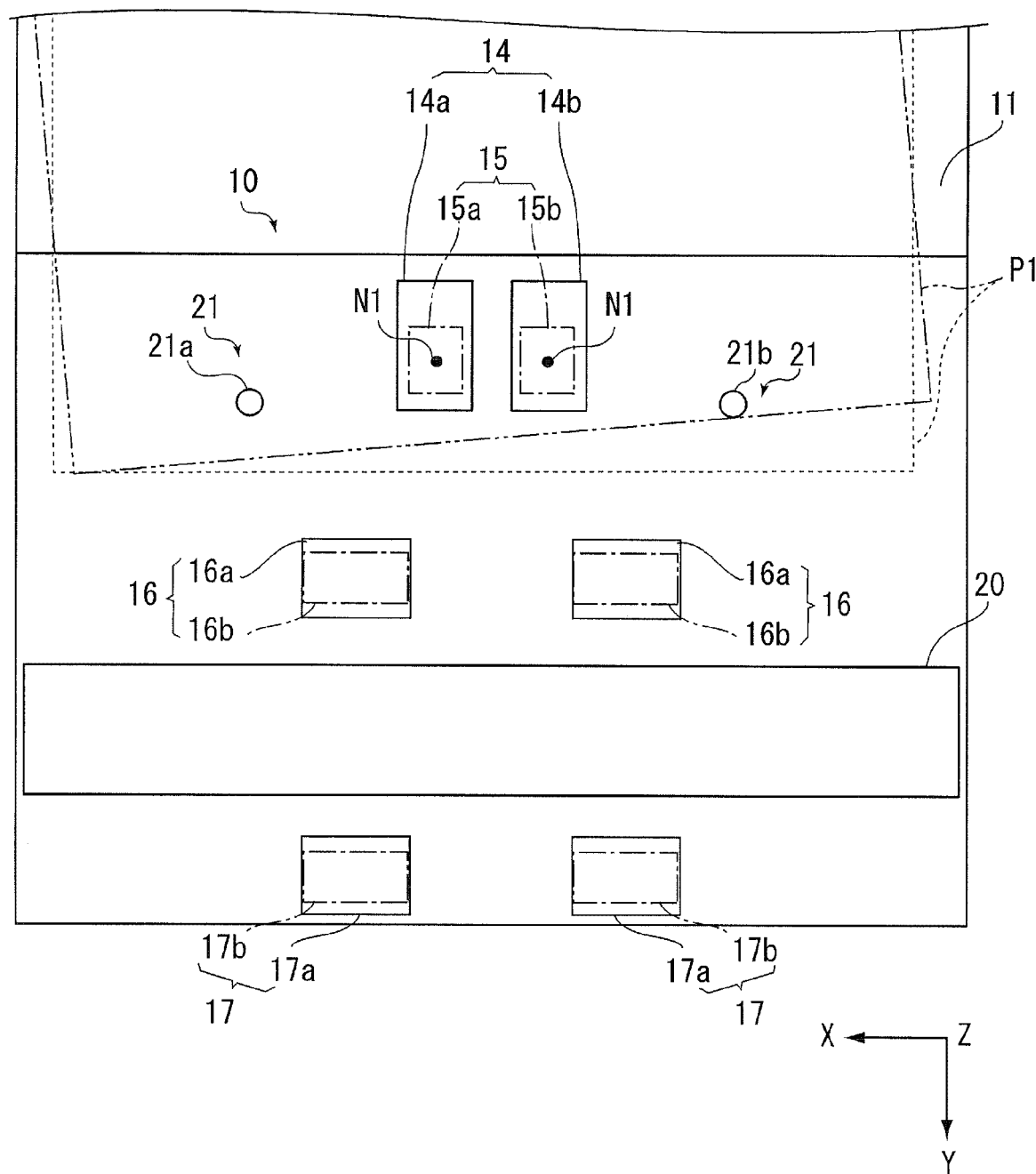
FIG. 6 is a view for explaining detection of a skewed sheet in a skew detection section.

FIG. 1 is an external perspective view illustrating the scanner according to the invention. FIG. 2 is a perspective view of the scanner according to the invention as viewed from a different angle from FIG. 1. FIG. 3 is a side sectional view illustrating a sheet transport path in the scanner according to the invention. FIG. 4 is a perspective view illustrating a state where an upper unit of the scanner according to the invention is opened. FIG. 5 is a schematic plan view of the sheet transport path in the scanner according to the invention. FIG. 6 is a view for explaining detection of a skewed sheet in a skew detection section.

Figure 7:
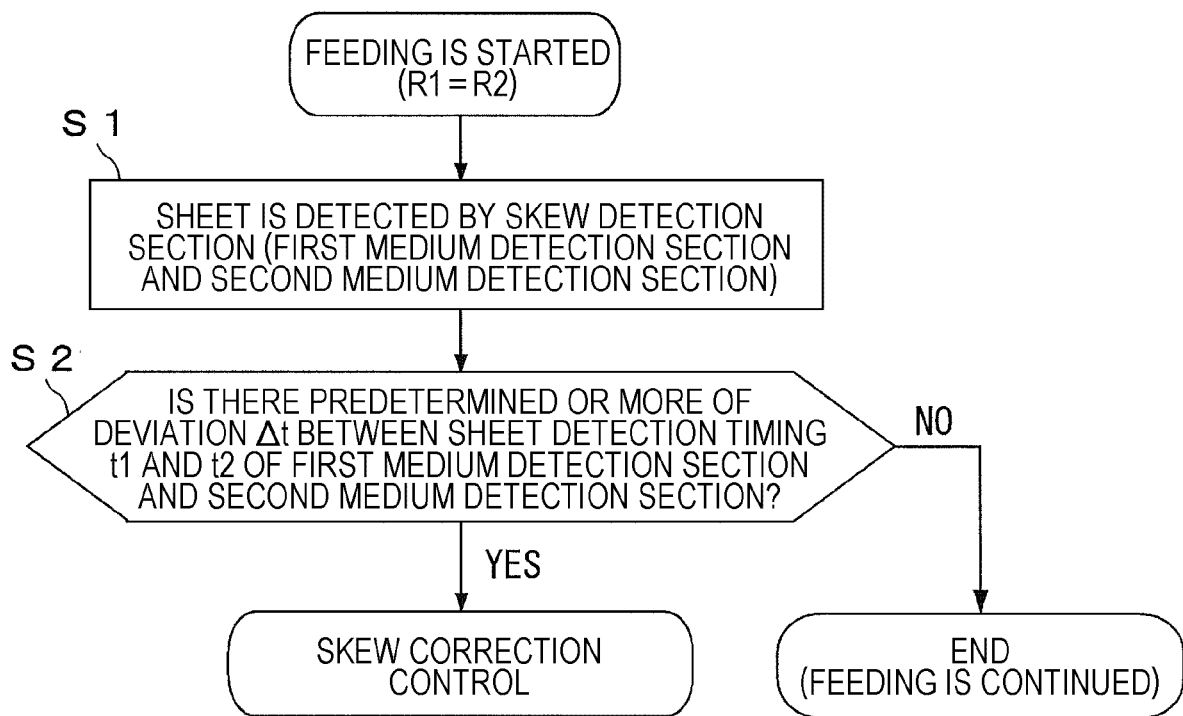
FIG. 7 is a flowchart for explaining a flow from a start of feeding by a feeding roller until a control section determines whether or not skew correction control is performed.
Figure 8:
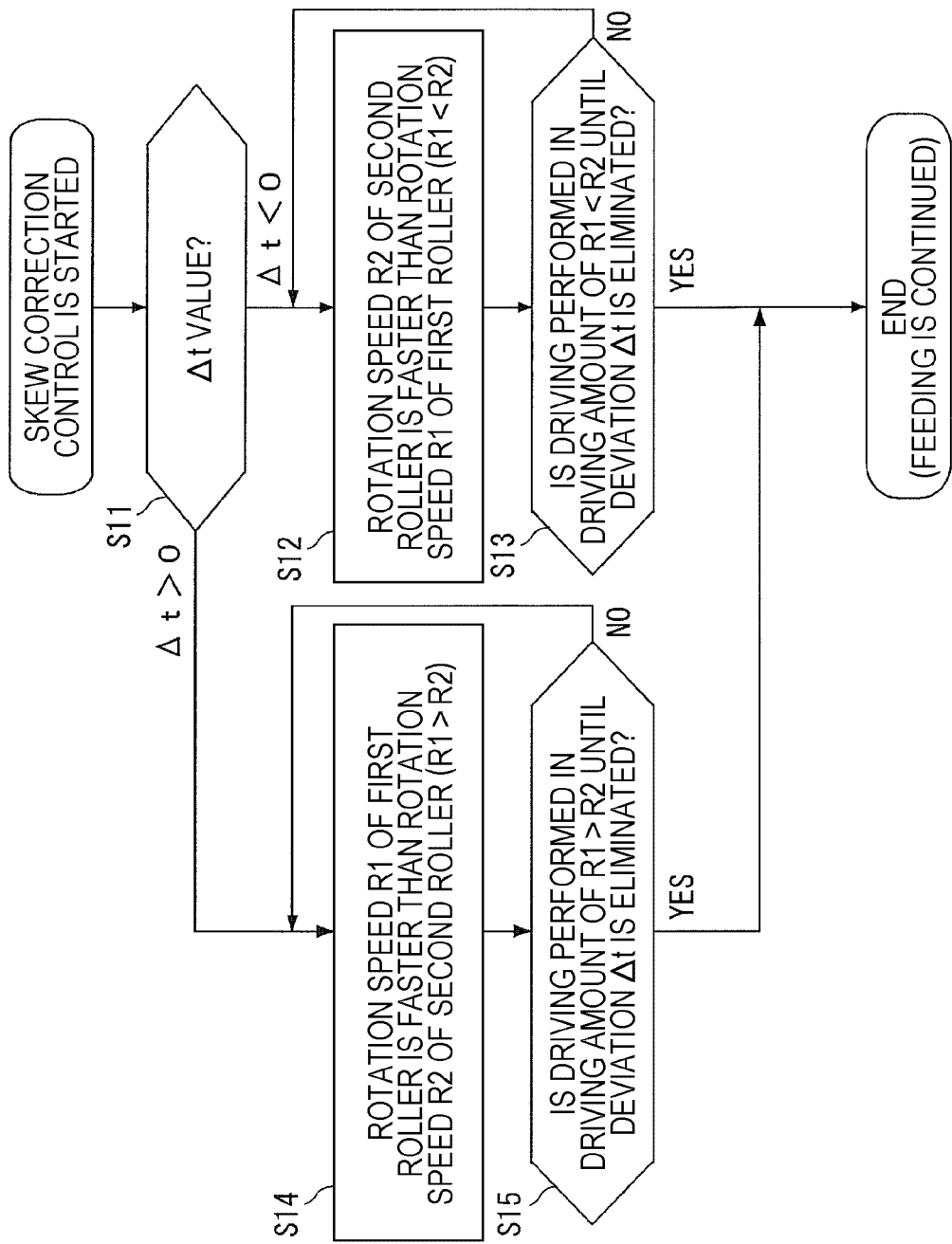
FIG. 8 is a flowchart for explaining a flow of the skew correction control which is executed by the control section.
Figure 9:
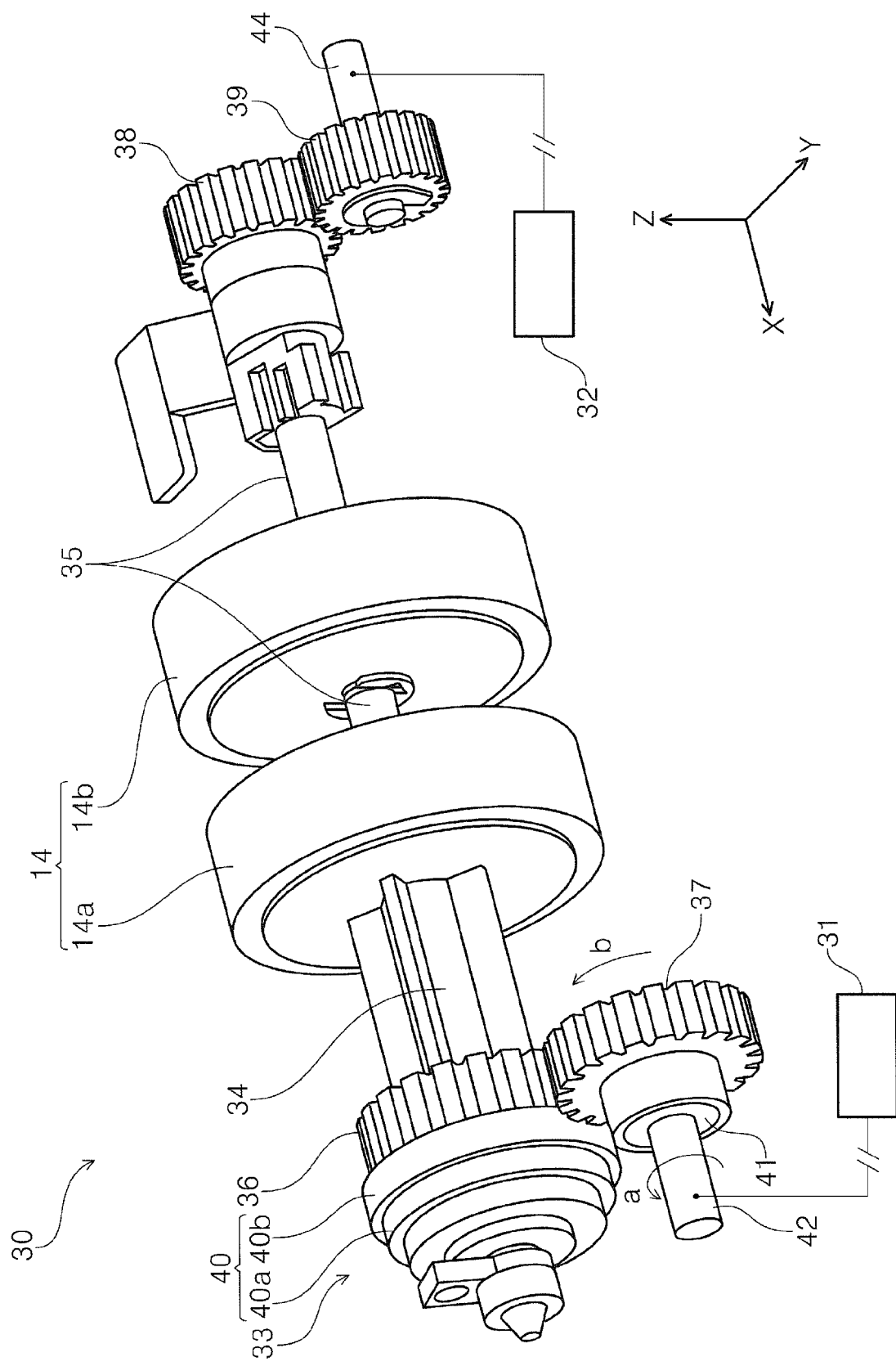
FIG. 9 is a perspective view illustrating a driving mechanism of a first roller and a second roller.
Figure 10:
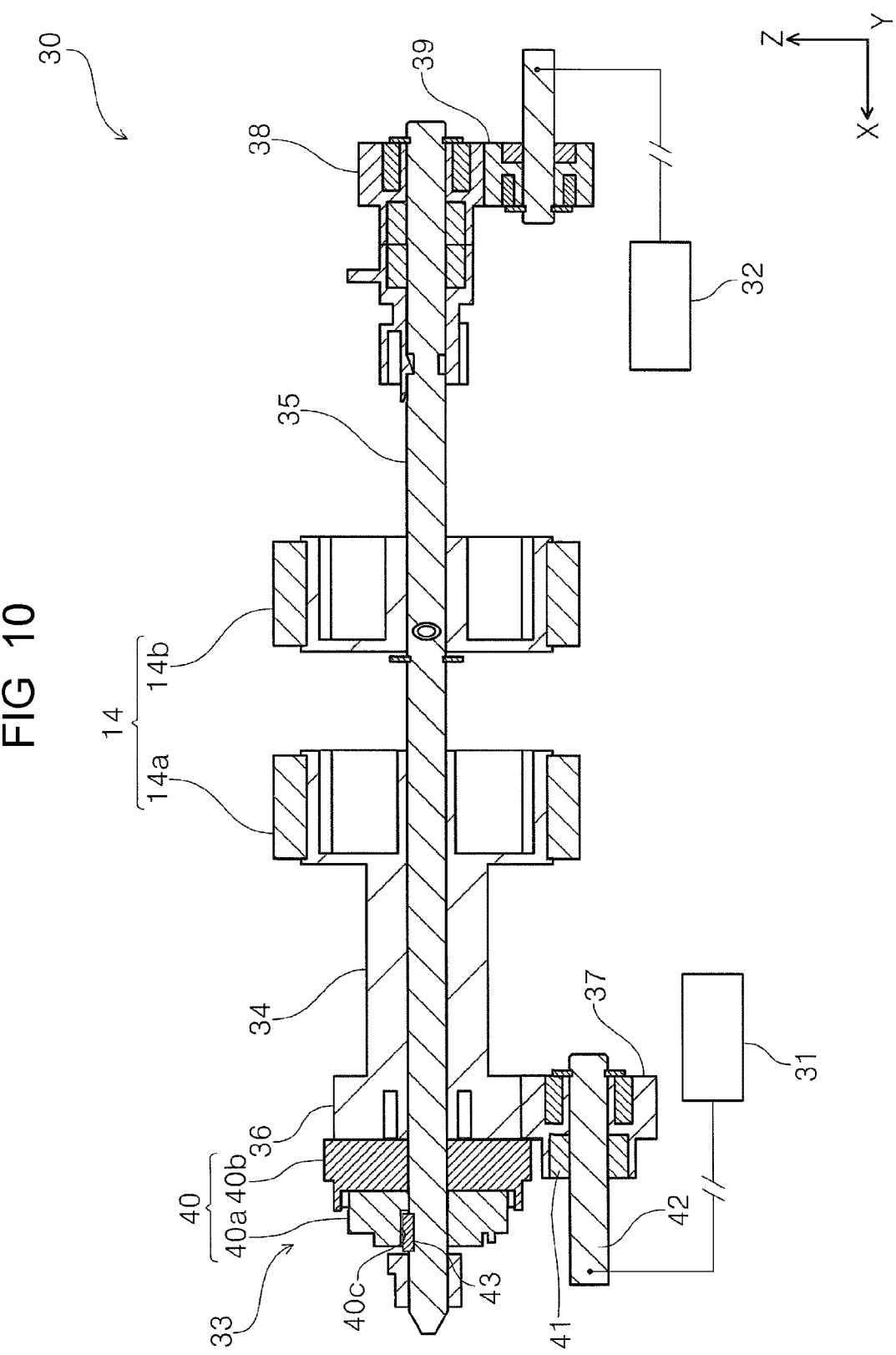
FIG. 10 is a sectional view illustrating the driving mechanism of the first roller and the second roller.

FIG. 7 is a flowchart for explaining a flow from a start of feeding by a feeding roller until a control section determines whether or not skew correction control is performed. FIG. 8 is a flowchart for explaining a flow of the skew correction control which is executed by the control section. FIG. 9 is a perspective view illustrating a driving mechanism of a first roller and a second roller. FIG. 10 is a sectional view illustrating the driving mechanism of the first roller and the second roller. FIG. 11 is a sectional view illustrating another example of the driving mechanism of the first roller and the second roller.

In an X-Y-Z coordinate system in each drawing, an X direction is an apparatus width direction and a sheet width direction, a Y direction is a sheet transporting direction. A Z direction is a direction intersecting the Y direction and indicates a direction orthogonal to a surface of a sheet to be substantially transported. In addition, a +Y direction side is a front side of the apparatus and a −Y direction side is a rear side of the apparatus. In addition, a left side as viewed from the front side of the apparatus is a +X direction and a right side is a −X direction. In addition, a +Z direction side is an upper side (including upper portion, an upper surface, or the like) of the apparatus and a −Z direction side is a lower side (including a lower portion, a lower surface, or the like) of the apparatus. In addition, a direction (+Y direction side) in which the sheet is fed is referred to as a "downstream" and an opposite direction (−Y direction side) is referred to as an "upstream".

Outline of Scanner

Hereinafter, the scanner 1 according to the invention will be described mainly with reference to FIGS. 1 and 2.

The scanner 1 illustrated in FIGS. 1 and 2 includes a reading section 20 (FIG. 3) as a "processing section" that processes a sheet P (medium) in an inside of an apparatus body 2. The process performed by the reading section 20 on the sheet P is an image reading process for reading an image of the sheet P (medium)

The apparatus body 2 is configured to include a lower unit 3 and an upper unit 4. The upper unit 4 is attached to the lower unit 3 so as to be capable of opening and closing on a downstream side in the sheet transporting direction as a rotation fulcrum, is rotated on the front side of the apparatus to open, and exposes the sheet transport path of the sheet P, and thereby paper jam of the sheet P can easily be processed.

A medium placing section 11 on which the sheet P is placed is provided on the rear side (−Y direction side) of the apparatus of the apparatus body 2. Reference numeral 11*a* is a placing surface 11*a* of the sheet P. A medium feeding device 10 (FIG. 3), which feeds the sheet P from the medium placing section 11 toward the reading section 20, is provided on the inside of the apparatus body 2.

In addition, in the scanner 1, the medium placing section 11 is detachably provided in the apparatus body 2. In addition, a detailed configuration of the medium feeding device 10 will be described later.

Furthermore, the medium placing section 11 is provided with a pair of right and left edge guides 12 and 12 including guide surfaces 13 for guiding side edges of the sheet P in a width direction (X direction) intersecting a feeding direction (Y direction) of the sheet P.

The edge guides 12 and 12 provided slidably in the X direction according to a size of the sheet P. In the embodiment, the edge guides 12 and 12 are configured, such that following an X movement of one edge guide 12 (for example, +X side), the other edge guide 12 (−X side) moves in the opposite direction by a known rack and pinion mechanism.

That is, in the medium placing section 11, the sheet P is aligned at a center in the width direction, a feeding roller 14, which is described later, is provided in a center region in the width direction, and is configured so as to feed the sheet in a so-called center sheet feeding system. FIG. 1 illustrates a state where the edge guides 12 and 12 are at an outermost position and FIG. 2 illustrates a state where the edge guides 12 and 12 are at an innermost position.

The medium placing section 11 includes a first auxiliary paper support 8 and a second auxiliary paper support 9. As illustrated in FIG. 2, the first auxiliary paper support 8 and the second auxiliary paper support 9 can be housed in the inside of the medium placing section 11, are configured to be capable of pulling out from the medium placing section 11 as illustrated in FIG. 1, and a length of the placing surface 11*a* can be adjusted.

The apparatus body 2 includes an operation panel 7 for displaying various reading setting, reading execution operations, reading setting contents, and the like, on the front side of the apparatus of the upper unit 4.

A feeding port 6 continuous with the inside of the apparatus body 2 is provided in an upper portion of the upper unit 4, the sheet P placed on the medium placing section 11 is sent from the feeding port 6 toward the reading section 20 (FIG. 3) provided in the inside of the apparatus body 2.

Furthermore, a sheet discharge tray 5, which is described later, is provided on the front side of the apparatus of the lower unit 3.

Sheet Transport Path in Scanner

Next, the sheet transport path in the scanner 1 will be described mainly with reference to FIG. 3. In addition, a dotted line in FIG. 3 indicates the transport path of the sheet P.

In addition, in the scanner 1, the sheet P that is a document is sent by the medium feeding device 10 from the medium placing section 11 toward the reading section 20.

In the embodiment, the medium feeding device 10 illustrated in FIG. 3 includes the feeding roller 14 as a "feeding section" for sending the sheet P placed on the medium placing section 11 toward the reading section 20, a skew detection section 21 of the sheet P fed from the feeding roller 14, and a control section 19 that controls an operation of the feeding roller 14.

As illustrated in FIG. 4, the feeding roller 14 is configured to include a pair of first roller 14a and second roller 14b which is provided in the width direction (X direction) intersecting the medium feeding direction (+Y direction).

The invention is characterized by the control of the operation of the feeding roller 14 (the first roller 14a and the second roller 14b) by the control section 19 performed based on detection information of the skew detection section 21.

The skew detection section 21 and the control of the control section 19 based on the detection information of the skew detection section 21 will be described in detail after the description of the sheet transport path.

In the medium feeding device 10, a separation roller 15 for nipping and separating the sheet P with the feeding roller 14 at a position facing the feeding roller 14 provided on the downstream side of the medium placing section 11. As illustrated in FIG. 5, the separation roller 15 also includes a pair of first separation roller 15a and second separation roller 15b corresponding to the pair of first roller 14a and second roller 14b configuring the feeding roller 14.

In addition, as illustrated in FIG. 5, the feeding roller 14 and the separation roller 15 are provided in a center region in the width direction (X direction) (see also FIG. 4 for the feeding roller 14).

Returning to FIG. 3, the sheet P which is placed on the medium placing section 11 is picked up by the feeding roller 14 rotatably provided with respect to the lower unit 3 and is fed to the downstream side (+Y direction side). Specifically, the feeding roller 14 is rotated while being in contact with a surface of the sheet P facing the medium placing section 11, and thereby the sheet P is fed toward the downstream side. Therefore, in a case where a plurality of sheets P are set in the medium placing section 11 in the scanner 1, the sheets P are sequentially fed toward the downstream side from the sheet P on a placing surface 11a side.

A pair of transport rollers 16, the reading section 20, and a pair of discharge rollers 17 are provided on the downstream side of the feeding roller 14.

The pair of transport rollers 16 is provided on an upstream side of the reading section 20 and transports the sheet P fed by the feeding roller 14 toward the reading section 20. The pair of transport rollers 16 is configured to include a transport driving roller 16a and a transport driven roller 16b.

As illustrated in FIG. 5, similar to the feeding roller 14, the pair of transport rollers 16 and the pair of discharge rollers 17 are also provided in the center region in the medium width direction (see also FIG. 4 for the transport driving roller 16a and a discharge driving roller 17a).

The reading section 20 includes an upper reading sensor 20a provided on the upper unit 4 side and a lower reading sensor 20b provided on the lower unit 3 side. In the embodiment, the upper reading sensor 20a and the lower reading sensor 20b are configured as contact image sensor modules (CISM) as an example.

An image of at least one of a front surface and a rear surface of the sheet P is read in the reading section 20 and then the sheet P is nipped by the pair of discharge rollers 17 positioned on the downstream side of the reading section 20, and is discharged from a discharge port 18 provided on the front side of the apparatus of the lower unit 3. The pair of discharge rollers 17 is configured to include the discharge driving roller 17a and a discharge driven roller 17b.

In addition, in the embodiment, the feeding roller 14, the transport driving roller 16a, and the discharge driving roller 17a are rotationally driven by at least one driving source (not illustrated) provided in the lower unit 3. In addition, the driving source (not illustrated) is controlled by the control section 19 so that driving of the feeding roller 14, the transport driving roller 16a, and the discharge driving roller 17a is controlled. That is, the control section 19 controls a sending operation of the sheet P.

The lower unit 3 is provided with the sheet discharge tray 5 configured to be capable of being drawn from the discharge port 18 toward the front side of the apparatus. The sheet discharge tray 5 can be in a state of being housed in a bottom portion of the lower unit 3 (FIG. 1) and in a state of being drawn to the front side of the apparatus (not illustrated). The sheet discharge tray 5 is in the state of being drawn, the sheet P discharged from the discharge port 18 can be stacked on the sheet discharge tray 5.

In addition, as illustrated in FIG. 3, a first detection section 22, which detects presence or absence of the sheet P placed on the medium placing section 11, is provided in a placing region of the sheet by the medium placing section 11 on the upstream side of the feeding roller 14 in the medium feeding direction. In addition, a second detection section 23 and a third detection section 24 are provided in order on the downstream side of the pair of transport rollers 16 and the downstream side of the pair of discharge rollers 17. A position of the sheet P in the medium feeding direction can be detected by the second detection section 23 and the third detection section 24.

The first detection section 22, the second detection section 23, and the third detection section 24 can be provided, for example, in the center region in the width direction.

Skew Detection Section

As illustrated in FIGS. 4 and 5, the skew detection section 21 is disposed on the upstream side from the pair of transport rollers 16 and the downstream side from the feeding roller 14 in the medium transporting direction (+Y direction). In the embodiment, the pair of transport rollers 16 is an "upstream side transport section" which is provided between the feeding roller 14 and the reading section 20, and provided on a most upstream side among transport sections which transport the sheet P. In a case where another pair of rollers (transport section) is provided between the feeding roller 14 and the pair of transport rollers 16, the skew detection section 21 is provided on the upstream side from the other pair of rollers.

Therefore, skew of the sheet P fed by the feeding roller 14 can be detected at an early stage after the start of the feeding.

Furthermore, in the embodiment, as illustrated in FIG. 5, a part of the skew detection section 21 overlaps with the feeding roller 14 at a position y1 in the medium transporting direction.

More specifically, the skew detection section 21 is disposed on the downstream side from a position at which the feeding roller 14 applies a feeding force to the sheet P, that is, a first position N1 that is a nip position between the feeding roller 14 and the separation roller 15 so as to overlap with a part of the feeding roller 14.

As described above, the skew detection section 21 is provided on the immediate downstream side of the first position N1, so that the sheet P is fed by the feeding roller 14 and then the sheet P, which is sent to the downstream side, can be detected at a further early stage.

In addition, a pair of skew detection sections 21 is provided at an interval so as to be positioned on both sides of the feeding roller 14 in the width direction (X direction).

In the pair of skew detection sections 21, a +X direction side is referred to as a first medium detection section 21a and a −X direction side is referred to as a second medium detection section 21b. The first medium detection section 21a and the second medium detection section 21b are respectively configured to be capable of detecting the medium.

In the embodiment, as the first medium detection section 21a and the second medium detection section 21b, an optical sensor including a light emission section (not illustrated) which emits light and a light receiving section (not illustrated) which receives reflected light of the light emitted from the light emission section.

In addition, in addition to the optical sensor, as the first medium detection section 21a and the second medium detection section 21b, an ultrasonic sensor including an emission section which emits ultrasonic waves and a receiving section which is provided to face the emission section with the transported sheet interposed therebetween. In addition, a lever type sensor, which detects displacement of a mechanical lever moved by the contact with the transported sheet in an optical type or an electric contact type, can also be used.

In addition, similar medium sensor can be used for the first detection section 22, the second detection section 23, and the third detection section 24.

Skew (skewing), in which a leading end of the sheet is obliquely transported, is determined by presence or absence of the detection of the sheet in the first medium detection section 21a and the second medium detection section 21b.

As illustrated in FIG. 5, in a case where the sheet P is immediately transported without skewing, the leading end of the sheet is detected substantially at the same time by both the first medium detection section 21a and the second medium detection section 21b. However, in FIG. 6, if skew occurs as in the sheet P1 indicated by a two-dotted chain line, one side (first medium detection section 21a) of the sheet is detected first and then the other (second medium detection section 21b) is detected. In addition, in FIG. 6, reference numeral P1 indicated by a dotted line indicates the sheet which is in a state of being normally transported.

In a case where a deviation (t1−t2=Δt) occurs between a time (hereinafter, referred to as a detection timing t1) until the sheet P is detected by the first medium detection section 21a after the start of the feeding by the feeding roller 14 and a time (hereinafter, referred to as a detection timing t2) until the sheet P is detected by the second medium detection section 21b after the start of the feeding by the feeding roller 14, the control section 19 determines that skew occurs in the sheet P.

In addition, in a case where Δt is a short period of time, skew is not determined, but in a case where Δt exceeds a predetermined threshold, skew is determined.

In the embodiment, the control section 19 executes the "skew correction control" for correcting the deviation with the deviation (Δt) of the detection timing of the sheet P by the first medium detection section 21a and the second medium detection section 21b as a skew amount.

Control by Control Section

Next, the control of the feeding roller 14 by the control section 19 based on a detection result of the skew detection section 21 will be described.

The control section 19 is capable of executing the "skew correction control" for correcting skew with a difference between a rotation speed R1 of the first roller 14a of the feeding roller 14 and a rotation speed R2 of the second roller 14b of the feeding roller 14 with respect to at least one of a sheet P1 (FIG. 6) detected by the skew detection section 21 and subsequent media sheets P2 (not illustrated) fed following the sheet P1 based on a skew amount (Δt) in the sheet P1 as the "first medium".

The first roller 14a and the second roller 14b configuring the feeding roller 14 can be rotated at a constant speed or can be rotated at different speeds.

A driving mechanism for changing the rotation speed of the first roller 14a and the second roller 14b will be described later after describing the skew correction control.

A flow from the start of the feeding of the sheet P1 by the feeding roller 14 until the control section 19 determines whether or not the skew correction control is performed will be described with reference to FIG. 7.

The feeding of the sheet P1 by the feeding roller 14 is started by setting the rotation speeds of the first roller 14a and the second roller 14b at a constant speed (rotation speed R1 of the first roller 14a=rotation speed R2 of the second roller 14b, R1=R2 is described in FIG. 7).

When the first sheet P1 which is separated between the feeding roller 14 and the separation roller 15 reaches the skew detection section 21, the sheet P1 is detected by each of the first medium detection section 21a and the second medium detection section 21b configuring the skew detection section 21 (step S1).

When the sheet P1 is detected by the first medium detection section 21a and the second medium detection section 21b, the detection timing t1 of the sheet P1 by the first medium detection section 21a and the detection timing t2 of the sheet P by the second medium detection section 21b are compared to each other to determine whether or not a deviation (t1−t2=Δt) therebetween is a predetermined value or more (step S2).

In a case where the deviation Δt of the detection timing is less than a predetermined threshold (NO in step S2), it is determined that skew does not occur and the feeding is continued without performing the skew correction control. In a case where the deviation Δt of the detection timing is a predetermined threshold or more (YES in step S2), the skew correction control for correcting skew of the sheet P1 is performed.

The skew correction control executed by the control section 19 will be described with reference to FIG. 8.

First in step S11, it is determined whether or not the value of the deviation Δt is larger or smaller than 0.

In a case where Δt<0, that is, Δt is minus, the detection timing t1 of the sheet P1 by the first medium detection section 21a is early and as illustrated in FIG. 6, it is considered to be a skewed state in which the +X direction side advances to the upstream side in the medium feeding direction and the −X direction side of the sheet P is delayed.

In such a case, the rotation speed R2 of the second roller 14b is faster than the rotation speed R1 of the first roller 14a (step S12). That is, the rotation speed R1<the rotation speed R2 (R1<R2 is described in FIG. 8).

Therefore, the −X direction side of the delayed sheet P can be fed so as to catch up to the +X direction side.

Driving of the first roller 14a and the second roller 14b in a state of the rotation speed R1<the rotation speed R2 is performed until the deviation Δt is eliminated. A driving time M of the first roller 14a and the second roller 14b in the state of the rotation speed R1<the rotation speed R2 until the deviation Δt is eliminated can be obtained by Δt/(R1−R2).

In step S13, it is determined whether or not driving is performed in the state of the rotation speed R1<the rotation speed R2 until the deviation Δt is eliminated, and in a case of NO in step S13, the process returns to step S12. If YES is determined in step S13, the skew correction control is terminated and it returns to normal feeding, that is, the rotation speeds of the first roller 14a and the second roller 14b are returned to the constant speed (rotation speed R1=rotation speed R2).

Returning to step S11, if Δt>0, that is, Δt is plus, the detection timing t2 is earlier than the detection timing t1 and conversely to the state of FIG. 6, it is considered to be a skewed state in which the −X direction side of the sheet P1 advances to the upstream side in the medium feeding direction and the +X direction side of the sheet P1 is delayed.

In such a case, the rotation speed R1 of the first roller is faster than the rotation speed R2 of the second roller (step S14). That is, the rotation speed R1>the rotation speed R2 (R1>R2 is described in FIG. 8).

Therefore, the +X direction side of the delayed sheet P can be fed so as to catch up to the −X direction side.

Driving of the first roller 14a and the second roller 14b in a state of the rotation speed R1>the rotation speed R2 is performed until the deviation Δt is eliminated. The driving time M of the first roller 14a and the second roller 14b in the state of the rotation speed R1>the rotation speed R2 until the deviation Δt is eliminated can be obtained by Δt/(R1−R2).

In step S15, it is determined whether or not driving is performed in the state of the rotation speed R1>the rotation speed R2 until the deviation Δt is eliminated, and in a case of NO in step S15, the process returns to step S14. If YES is determined in step S15, the skew correction control is terminated and it returns to normal feeding, that is, the rotation speeds of the first roller 14a and the second roller 14b are returned to the constant speed (rotation speed R1=rotation speed R2).

In a case where the control section 19 executes the skew correction control, if there is a difference between the rotation speeds of the first roller 14a and the second roller 14b, one of the first roller 14a and the second roller 14b may be stopped. For example, in a case of the rotation speed R1<the rotation speed R2, only the second roller 14b is driven and the first roller 14a is stopped. In addition, in a case of the rotation speed R1>the rotation speed R2, only the first roller 14a is driven and the second roller 14b is stopped.

Therefore, the control section 19 is easily performed control of giving a difference between the rotation speed R1 of the first roller 14a and the rotation speed R2 of the second roller 14b.

In addition, for example, in FIG. 6, the first roller 14a on the side (+X direction side) in which the leading end of the sheet advances first is stopped, so that the side (−X direction side) in which the leading end of the sheet is delayed can catch up to the side (+X direction side) advancing with a short feeding distance. Therefore, the skew correction control can be efficiently performed.

As a matter of course, a difference between the rotation speed R1 and the rotation speed R2 may be given while driving both the first roller 14a and the second roller 14b.

In FIG. 8, a case where the skew of the sheet P1 is corrected by the feeding roller 14 (first roller 14a and second roller 14b) based on the skew amount of the sheet P1 detected by the skew detection section 21 is described.

Following the sheet P1, in a case where the next and subsequent sheets P2, P3, . . . are fed, skew is detected in the skew detection section 21 for each sheet of the sheets P2, P3, . . . , and the skew correction control can be performed for each sheet based on a skew detection result of each sheet.

In addition, for example, the skew of one sheet P1 is detected by the skew detection section 21 and for the next and subsequent sheets P2, P3, . . . , the skew correction control from the start of feeding can be performed based on the detection result of the skew of the sheet P1. Therefore, it is possible to improve the throughput of image reading.

In addition, when the skew correction control from the start of the feeding is performed for the next and subsequent sheets P2, P3, . . . based on the detection result of the skew of the sheet P1, in a case where a speed difference in the rotation of the first roller 14a and the second roller 14b is given by stopping one of the first roller 14a and the second roller 14b, the feeding start timing by the first roller 14a and the feeding start timing by the second roller 14b can also be shifted.

As described above, in the skew correction control of the embodiment, the skew of the sheet P can be corrected by the feeding roller 14 (feeding section) which is provided on the most upstream side of the medium transport path. That is, the correction of the skew of the sheet P can be performed at an early stage after the start of the feeding from the medium placing section 11. Therefore, the skew of the sheet P can be efficiently corrected.

In addition, it is not necessary to secure a wide path width of the medium transport path in anticipation of the skew of the sheet P, and it is possible to avoid enlarging the apparatus.

In addition, when the sheet P is nipped by both the feeding roller 14 and the pair of transport rollers 16 that is the downstream side transport section of the feeding roller 14, since the sheet P is nipped at two places on upstream and downstream in the medium transporting direction, it is difficult to rotate the sheet P so as to correct the skew.

In the embodiment, after the feeding of the sheet P is started by the feeding roller 14, the leading end of the sheet P and until the leading end of the sheet P reaches the transport position by the pair of transport rollers 16 that is the downstream side transport section of the feeding roller 14, a difference between the rotation speed R1 of the first roller 14a and the rotation speed R2 of the second roller 14b is given, so that skew can be corrected by rotating the sheet P and it is possible to efficiently perform the skew correction control.

In addition, in the embodiment, the skew detection section 21 is provided immediately on the downstream side of the feeding roller 14, that is, disposed on the upstream side from the pair of transport rollers 16 which is provided on the most upstream side among the transport sections transporting the sheet provided between the feeding roller 14 and the reading section 20. Therefore, the skew detection section 21 can be configured to be capable of executing the skew correction control with respect to the sheet P1 based on the skew amount in the sheet P1 (first medium) detected by the skew detection section 21.

In addition, it is determined that the skew of the sheet P does not occur at the detection position by the skew detection section 21 or the skew is small so that the correction of the skew is not necessary, but after that, the leading end of the sheet is nipped by the pair of transport rollers 16 and the skew may be increased at the time of image reading in the reading section 20.

For example, in FIG. 3, if the second detection section 23 provided on the downstream side of the pair of transport rollers 16 and the third detection section 24 provided on the downstream side of the pair of discharge rollers 17 have a function of the "skew detection section", skew which is not detected at the position of the skew detection section 21 can be detected. In addition, there is a case where it can be detected that the leading end of the sheet obliquely enters the reading section 20 from reading information in the reading section 20.

For example, when there is the deviation Δt of a predetermined value or more between the detection timing t1 and the detection timing t2 in which respective detection timing of both ends in the width direction (X direction) of the sheet P1 detected by the reading section 20, that is, a +X side end portion and a −X side end portion are the detection timing t1 and the detection timing t2, it is possible to determine that skew occurs.

Skew of the sheet P1 is not detected at the detection position by the skew detection section 21, but in a case where it is determined that skew of the sheet P1 is detected on the downstream side from the detection position by the skew detection section 21, for example, in the reading section 20, it is possible to execute the skew correction control with respect to the next and subsequent sheets P2, P3, . . . based on the skew detection result of the sheet P1 by the reading section 20.

The "skew detection section" can be provided at other positions than the position of the skew detection section 21 of the embodiment. For example, the "skew detection section" can be provided on the upstream side from the feeding roller 14. In this case, as the "skew detection section", for example, a sensor based on the same or similar principle as a sensor capable of detecting two-dimensional (plane) movement used for a computer mouse can be used.

Even in a case where the "skew detection section" is provided on the upstream side from the feeding roller 14, similar to the embodiment, the skew of the sheet P1 fed by the feeding roller 14 can be detected early and correction of skew with respect to the sheet P1 can be performed.

In addition, as described above, the reading section 20 can be used as the "skew detection section" in addition to the second detection section 23 or the third detection section 24. That is, the reading section 20 can also serve as the "skew detection section". In this case, when skew is detected on the first sheet P1, the skew detection result of the sheet P1 is fed back, so that the skew correction control can be executed from the start of the feeding with respect to the next and subsequent sheets P2, P3, . . . .

Since the reading section 20 also serves as the "skew detection section", it is possible to reduce the number of components and to reduce a manufacturing cost.

Driving Mechanism of First Roller and Second Roller

Hereinafter, the driving mechanism of the first roller 14a and the second roller 14b will be described.

As described above, in a case where the control section 19 executes the "skew correction control" which is described above, the first roller 14a and the second roller 14b configuring the feeding roller 14 are driven so as to give a difference between the rotation speed R1 of the first roller 14a and the rotation speed R2 of the second roller 14b. In addition, in a case where the "skew correction control" is not performed and normal sheet feeding is performed, the first roller 14a and the second roller 14b are rotationally driven at a constant speed.

In order to facilitate switching between driving to give a difference in speed between the first roller 14a and the second roller 14b, and driving in a constant speed, the first roller 14a and the second roller 14b include a following driving mechanism 30.

The driving mechanism 30 illustrated in FIGS. 9 and 10 includes a first driving source 31, a second driving source 32 that drives the second roller 14b, and a switching mechanism 33 that switches the driving source for driving the first roller 14a between the first driving source 31 and the second driving source 32.

An operation of the switching mechanism 33 is configured to be capable of being controlled by the control section 19.

In a case of executing the "skew correction control", the control section 19 causes the switching mechanism 33 to be in a first state in which the first roller 14a is driven by the first driving source 31, and in a case of not executing the "skew correction control", the control section 19 causes the switching mechanism 33 to be in a second state in which the first roller 14a is driven by the second driving source 32.

More specifically, as illustrated in FIGS. 9 and 10, the driving mechanism 30 includes a first rotation shaft 34 to which the first roller 14a is fixed and which is rotated by receiving power from the first driving source 31, and a second rotation shaft 35 which is provided on the same axis as that of the first rotation shaft 34, to which the second roller 14b is fixed, and which is rotated by receiving power from the second driving source 32.

In the embodiment, as illustrated in FIG. 10, the second rotation shaft 35 is provided by penetrating an inside of the first rotation shaft 34. The second rotation shaft 35 penetrates the inside of the first rotation shaft 34 so as to be rotatable relative to the first rotation shaft 34.

A first gear 36 is provided at an end portion of the first rotation shaft 34 on the +X direction side. In the embodiment, the first gear 36 is provided integrally with the first rotation shaft 34. The first gear 36 engages with a first transmission gear 37. The first transmission gear 37 is a gear that rotates upon receipt of power from the first driving source 31 via a power transmission mechanism (not illustrated). The first transmission gear 37 is provided with a one-way clutch 41.

The one-way clutch 41 receives power from a rotation shaft 42 that is driven by the first driving source 31. The one-way clutch 41 is configured as a clutch for transmitting a rotational torque of the rotation shaft 42 to the first transmission gear 37 only in a case where the rotation shaft 42 is driven in a direction (rotating direction when the sheet is fed: direction of arrow a of FIG. 9) in which the first roller 14a is rotated in a forward direction.

A second gear 38 is provided at an end portion of the second rotation shaft 35 on the −X direction side. The second gear 38 engages with a second transmission gear 39. The second transmission gear 39 is a gear which rotates by receiving power from the second driving source 32 via a power transmission mechanism (not illustrated). The second transmission gear 39 is provided to be fixed to a rotation shaft 44. The rotation shaft 44 receives a rotational torque from the second driving source 32. In addition, a one-way clutch is provided between the rotation shaft 44 and the second transmission gear 39.

In the embodiment, the switching mechanism 33 is configured to include an electromagnetic clutch 40. The electromagnetic clutch 40 is configured to include a first member 40a which is provided at an end portion of the second rotation shaft 35 on the +X direction side and a second member 40b which is fixed to the first rotation shaft 34 in FIGS. 9 and 10.

As illustrated in FIG. 10, in the embodiment, the electromagnetic clutch 40 is configured such that in a non-excited state, the first member 40a and the second member 40b are integrally set, and the first member 40a and the second member 40b are integrally rotated. In addition, in an excited state, the first member 40a moves to the +X direction side, a gap (not illustrated) is formed between the first member 40a and the second member 40b, and the first member 40a and the second member 40b are configured to be independently rotatable without being affected by the other side.

More specifically, the first member 40a is displaced in the X direction by switching between excitation and non-excitation of the electromagnetic clutch 40, and a recess groove 40c for receiving a key member 43 provided in the second rotation shaft 35 is formed. As described above, the key member 43 enters the recess groove 40c, so that when the second rotation shaft 35 rotates, the first member 40a always moves along with the second rotation shaft 35. However, the movement of the recess groove 40c in the X direction with respect to the key member 43, that is, the first member 40a is allowed.

In a state of the non-excited state in which the first member 40a and the second member 40b of the electromagnetic clutch 40 are integrally set, the first rotation shaft 34 and the second rotation shaft 35 are in a state of being connected via the electromagnetic clutch 40, and thereby the first roller 14a and the second roller 14b are rotated in a completely synchronized state. That is, the second state can be obtained in which the first rotation shaft 34 and the second rotation shaft 35 are connected, and are integrally rotated by the common second driving source 32.

In a case where the electromagnetic clutch 40 is in the non-excited state, the control section 19 stops the driving of the first driving source 31. Here, due to the rotation of the first rotation shaft 34, that is, the rotation of the first gear 36, the first transmission gear 37 also rotates (direction of arrow b of FIG. 9), but since the one-way clutch 41 is provided, the rotation shaft 42 is not rotated, that is, the first rotation shaft 34 can freely rotate without receiving a rotational load from a first driving source 31 side.

In the excited state in which the gap is formed between the first member 40a and the second member 40b in the electromagnetic clutch 40, the first rotation shaft 34 and the second rotation shaft 35 are separated from each other and thereby the first roller 14a and the second roller 14b are in the independently rotatable state.

That is, a configuration can be provided in which the first roller 14a is driven by the first driving source 31, the second roller 14b is driven by the second driving source 32, and the first roller 14a and the second roller 14b are driven by individual driving sources.

As described above, the switching mechanism 33 switches between the first state in which the first rotation shaft 34 and the second rotation shaft 35 are separated and individually rotated, and the second state in which the transmission of the power from the first driving source 31 to the first rotation shaft 34 is interrupted, and the first rotation shaft 34 and the second rotation shaft 35 are connected and integrally rotated. The contents described above are summarized in Table.

TABLE

| | Switching mechanism | Electromagnetic clutch | First driving source | Second driving source |
|---|---|---|---|---|
| First state | First roller is driven by first driving source and second roller is driven by second driving source | Excitation | Driving | Driving |

TABLE-continued

| | Switching mechanism | Electromagnetic clutch | First driving source | Second driving source |
|---|---|---|---|---|
| Second state | Both first roller and second roller are driven by first driving source | Non-excitation | Stop | Driving |

With the configuration described above, the control section 19 can easily perform switching between control of giving a difference in speed between the first roller 14a and the second roller 14b in a case where the control section 19 executes the "skew correction control", and control of driving the first roller 14a and the second roller 14b at a constant speed in a case where the control section 19 does not execute the "skew correction control". Other Examples of Driving Mechanism of First Roller and Second Roller The first roller 14a and the second roller 14b can be simply driven by individual driving sources.

That is, as illustrated in FIG. 11, a configuration can be provided in which the first driving source 31 for driving the first roller 14a and the second driving source 32 for driving the second roller 14b are provided without providing the electromagnetic clutch 40 (switching mechanism 33), and the control section 19 independently controls the first driving source 31 and the second driving source 32. In FIG. 11, the first rotation shaft 34 and the second rotation shaft 35 are not connected and are rotatable individually.

In a case where the first roller 14a and the second roller 14b are rotated at a constant speed, the control section 19 performs control to synchronize the rotation of the first roller 14a and the rotation of the second roller 14b.

In addition, the first roller 14a and the second roller 14b can be configured to be driven by one driving source.

In this case, for example, a first power transmission mechanism having gear trains for transmitting power from one driving source to the first roller 14a, and a second power transmission mechanism having gear trains for transmitting power from the same driving source to the second roller 14b are provided, and when the control section 19 executes the skew correction control, it is possible to give a difference between the rotation speed R1 of the first roller 14a and the rotation speed R2 of the second roller 14b by changing a reduction ratio of the gear either the first power transmission mechanism or the second power transmission mechanism.

One of the first roller 14a and the second roller 14b may be stopped by releasing meshing of a part of the gears of the gear trains of the first power transmission mechanism or the second power transmission mechanism.

In addition, it goes without saying that the invention is not limited to the above-described embodiments, and various modifications are possible within the scope of the invention described in the claims, and these are also included within the scope of the invention.

For example, the medium feeding device 10 described above can be mounted not only on the image reading apparatus but also on another apparatus. As an example, the medium feeding device 10 may be provided in a recording apparatus that performs recording on a sheet (medium) to be transported.

The entire disclosure of Japanese Patent Application No. 2017-250711, filed Dec. 27, 2017 is expressly incorporated by reference herein.

What is claimed is:

1. A medium feeding device comprising:
a processing section that processes a medium;
a medium placing section that supports the medium prior to the medium being transported to the processing section and is provided at an upstream of the processing section,
a feeding section that includes a first roller and a second roller provided at a feeding section interval in a width direction intersecting a medium feeding direction, and feeds the medium from the medium placing section;
a separation section that includes a first separation roller and a second separation roller providing at a separation section interval in the width direction, the first separation roller and the first roller nipping and separating the medium from the medium placing section;
a skew detection section that detects skew of the medium fed from the feeding section, the skew detection section comprising a first medium detection section and a second medium detection section provided at a skew detection section interval in the width direction, the skew detection section interval being greater than the feeding section interval and the separation section interval; and
a control section that controls an operation of the feeding section
wherein the control section is configured to execute skew correction control, the skew correction control being executed to make a difference between a rotation speed of the first roller and a rotation speed of the second roller to correct the skew,
the control section executing the skew correction control with respect to a first medium detected by the skew detection section and executing the skew correction control for subsequent media fed following the first medium based on a skew amount in the first medium.

2. The medium feeding device according to claim 1, wherein the control section stops one of the first roller and the second roller in a case of executing the skew correction control.

3. The medium feeding device according to claim 1, wherein the skew detection section is provided between the feeding section and the processing section, and is disposed on an upstream side from an upstream side transport section, which is provided on a most upstream side among transport sections which transport the medium.

4. The medium feeding device according to claim 3, wherein the skew detection section is disposed so as to overlap with a part of the feeding section on a downstream side from a position at which the feeding section applies a feeding force to the medium.

5. The medium feeding device according to claim 1, further comprising:
a first driving source that drives the first roller; and
a second driving source that drives the second roller.

6. The medium feeding device according to claim 1, further comprising:
a first driving source;
a second driving source that drives the second roller; and
a switching mechanism that switches driving source for driving the first roller between the first driving source and the second driving source,
wherein the control section which controls an operation of the switching mechanism
causes the switching mechanism to be in a first state in which the first roller is driven by the first driving source in a case where the skew correction control is executed, and
causes the switching mechanism to be in a second state in which the first roller is driven by the second driving source in a case where the skew correction control is not executed.

7. The medium feeding device according to claim 6, further comprising:
a first rotation shaft to which the first roller is fixed and which is rotated by receiving power from the first driving source; and
a second rotation shaft which is provided on a same axis as that of the first rotation shaft, to which the second roller is fixed, and which is rotated by receiving power from the second driving source,
wherein the switching mechanism is configured to switch between the first state in which the first rotation shaft and the second rotation shaft are separated and rotated individually and the second state in which transmission of power from the first driving source to the first rotation shaft is interrupted, and the first rotation shaft and the second rotation shaft are connected to be integrally rotated.

8. The medium feeding device according to claim 7, wherein the switching mechanism is configured to include an electromagnetic clutch.

9. An image reading apparatus comprising:
a reading section that reads a medium; and
the medium feeding device according to claim 1 and including the reading section as the processing section.

10. The image reading apparatus according to claim 9, wherein the reading section also serves as the skew detection section.

11. The medium feeding apparatus according to claim 1, further comprising:
two pairs of feed rollers that are provided between the feeding section and the processing section in the medium feeding direction and feed the medium from the feeding section to the processing section,
wherein the medium is fed from the medium placing section to the processing section by the feed section and the two pairs of feed rollers.

12. The medium feeding apparatus according to claim 6, further comprising:
a first power transmission path that is a path for transmitting power of the first driving source to the switching mechanism; and
a second power transmission path that is a path for transmitting power of the second driving source to the second roller,
wherein the first power transmission path is provided with a one-way clutch and the second power transmission path is not provided with a one-way clutch.

13. The medium feeding apparatus according to claim 7, further comprising:
a one-way clutch that is provide at a power transmission path for transmitting power of the first driving source to the switching mechanism,
wherein the switching mechanism includes an electromagnetic clutch.

* * * * *